United States Patent
Sesumi

(10) Patent No.: US 7,124,061 B2
(45) Date of Patent: Oct. 17, 2006

(54) SYSTEM LSI

(75) Inventor: Kazunari Sesumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 120 days.

(21) Appl. No.: 10/735,806

(22) Filed: Dec. 16, 2003

(65) Prior Publication Data

US 2005/0027488 A1    Feb. 3, 2005

(30) Foreign Application Priority Data

Jul. 16, 2003    (JP)    ............................. 2003-275176

(51) Int. Cl.
G06F 11/30    (2006.01)

(52) U.S. Cl. .................................... 702/186

(58) Field of Classification Search ................ 702/186; 711/110, 167; 710/240
See application file for complete search history.

(56) References Cited

U.S. PATENT DOCUMENTS 5,740,382 A * 4/1998 Woodbridge et al. ....... 710/113
6,629,258 B1 * 9/2003 Kotaka ........................ 713/600
2002/0019898 A1 * 2/2002 Hayashi et al. ............. 710/110
2003/0181994 A1 * 9/2003 Mizoguchi ..................... 700/2

FOREIGN PATENT DOCUMENTS

JP    2001-175586    6/2001

* cited by examiner

Primary Examiner—Michael Nghiem
Assistant Examiner—Demetrius R. Pretlow
(74) Attorney, Agent, or Firm—Nixon Peabody LLP; Donald R. Studebaker

(57) ABSTRACT

A system LSI is provided which has a function of enabling data of an external device to be correctly read, when high-speed testing is carried out at a clock signal which is higher-speed than that at a time of usual operation. The system LSI has an external terminal for input of a wait signal from a testing device which is connected when high-speed testing is carried out. Moreover, when the wait signal is supplied to an external bus controller, the external bus controller extends an access time to a ROM during a period of time over which the wait signal is supplied.

9 Claims, 8 Drawing Sheets

FIG. 8

| CON | RMAP | ROMRQ | RAMRQ | IORQ |
|---|---|---|---|---|
| ROM ADDRESS | — | 1 | 0 | 0 |
| RAM ADDRESS | — | 0 | 1 | 0 |
| IO ADDRESS | — | 0 | 0 | 1 |
| O BANK | 0 | 1 | 0 | 0 |
| O BANK | 1 | 0 | 0 | 1 |

SYSTEM LSI

CROSS-REFERENCE TO RELATED APPLICATION

This application claims priority under 35 USC 119 from Japanese Patent Application No. 2003-275176, the disclosure of which is incorporated by reference herein.

BACKGROUND OF THE INVENTION

1. Field of the Invention

The present invention relates to a system LSI in which a CPU (central processing unit) and various types of controllers are brought together as a single LSI (large scale integrated circuit), and which can structure a microcomputer by being connected to an external memory.

2. Description of the Related Art

FIG. 2 is a structural diagram showing the basics of a conventional system LSI (which is also called a microcontroller)

A system LSI 10 accesses external devices such as a ROM (read-only memory) 1, a RAM (a memory to which data can be written and from which data can be read as occasion demands) 2, an input/output device (IO) 3, or the like, and has a CPU 11 which carries out overall computation and control on the basis of programs stored in the ROM 1. The CPU 11 is connected to an access control register 13 and an external bus controller 14 via a bus interface 12 (hereinafter called "bus I/F").

The bus I/F 12 serves as an intermediary at the time when the CPU 11 carries out writing and reading with respect to the access control register 13. A control signal CON, for controlling various types of operations, is supplied from the CPU 11 to the bus I/F 12. A ready signal RDY, which expresses whether or not preparations have been completed, and read data RDT are supplied from the bus I/F 12 to the CPU 11.

The access control register 13 holds data which has been supplied as write data WDT from the CPU 11 via the bus I/F 12, and functions to transfer the held data as an access cycle value CYC to the external bus controller 14.

Moreover, the bus I/F 12 has a decoder 12a which has the function of supplying, on the basis of the control signal CON supplied from the CPU 11 and as request signals ROMRQ, RAMRQ, IORQ and to the external bus controller 14, information expressing which external device (i.e., the ROM 1, the RAM 2, or the input/output device 3) is desired to be accessed.

When a request signal is supplied from the bus I/F 12, the external bus controller 14 carries out a reading or writing access operation with respect to the external device requested in the request signal, at an access cycle corresponding to the access cycle value CYC transferred from the access control register 13.

Selection signals CS1, CS2, CS3, which are from the external bus controller 14 and are for the ROM 1, the RAM 2 and the input/output device 3, are outputted to external terminals 15a, 15b, 15c, respectively. Moreover, an external address signal EXAD, which designates the region which is the object of reading or writing in the ROM 1 or the like which is selected, and an external bus read signal EXRD, which is for carrying out a read request, are outputted to external terminals 16, 17, respectively. On the other hand, external data EXDT, which has been read and outputted from the selected external memory, is supplied to the external bus controller 14 via an external terminal 18.

Moreover, in order for the external data EXDT, which has been outputted from a low-speed external device such as the input/output device 3, to be inputted without errors to the external bus controller 14, a wait signal XWAIT outputted from the input/output device 3 is supplied to the external bus controller 14 via an external terminal 19. The system LSI 10 operates synchronously with a clock signal CLK supplied from the exterior to a clock terminal 20.

In such a system LSI 10, operation is started by connecting the ROM 1, in which programs for processing control are stored in advance, and the RAM 2, which has a predetermined storage capacity, and the requisite input/output device 3, to the external terminals 15–19, and by the clock signal CLK of a predetermined frequency being supplied to the clock terminal 20 from the exterior.

Immediately after the start of operation, the maximum access cycle value CYC is held as an initial value in the access control register 13. In this way, thereafter, when the external bus controller 14 reads out an initial program from an external memory such as the ROM 1 or the RAM 2, access is carried out on the basis of this access cycle value CYC. Namely, after a read request has been carried out, an initialization program can be read out without errors by carrying out reading of the external data EXDT at the point in time when the clock number corresponding to the access cycle value CYC has been reached.

However, the system LSI has the following problems.

In a case in which, for example, a testing device is connected to the external terminals 15–19 and the clock terminal 20 of the system LSI 10 and is operated at a clock signal CLK which is higher-speed than that at the time of usual operation, even if the access cycle value CYC of the access control register 13 is set to the maximum value, there are cases in which, due to the effects of the drive circuits of the external terminals 15–19, the external data EXDT does not follow the clock signal CLK, the correct data cannot be read, and high-speed testing cannot be carried out.

SUMMARY OF THE INVENTION

An object of the present invention is to overcome the above-described problems.

A first aspect of the present invention is a system LSI comprising: a group of external terminals to which a plurality of external devices can be connected; a processor carrying out computation and control on the basis of programs; a bus interface specifying an external device which is to be an object of access from among the plurality of external devices on the basis of a control signal outputted from the processor, and outputting access time data instructing an access time to the external device and a request signal requesting access to the external device; a register storing the access time data outputted from the bus interface; an input terminal to which is inputted, from an exterior, a wait signal which designates extension of the access time to the external device; and an external bus controller which, in accordance with the access time data stored in the register and the request signal outputted from the bus interface, accesses the external device via the group of external terminals, and extends the access time to the external device in accordance with the wait signal inputted to the input terminal.

A second aspect of the present invention is a system LSI having a processor successively reading programs and carrying out computation and control; a bus interface specifying an external device which is to be an object of access on the basis of a control signal outputted from the processor; an access control register setting an access extension time with respect to the external device; and an external bus controller carrying out reading and writing of data between the bus interface and the external device in accordance with the access extension time, wherein the system LSI comprises a wait signal generating section which, on the basis of a control signal outputted from the processor, generates a wait signal which designates extension of an access time to the external device, and the external bus controller extends the access time to the external device in accordance with the wait signal.

A third aspect of the present invention is a system LSI having a processor successively reading programs and carrying out computation and control; a bus interface specifying, on the basis of a control signal outputted from the processor, one of an external device which is to be an object of access and an external device which is to output a wait signal; an access control register setting an access extension time with respect to the external device; and an external bus controller carrying out reading and writing of data between the bus interface and the external device in accordance with one of the access extension time and the wait signal, wherein the system LSI comprises a re-map signal generating section which, on the basis of a control signal outputted from the processor, generates a re-map signal, and the control signal specifies the external device when the re-map signal is supplied to the bus interface.

In accordance with the first aspect of the present invention, an input terminal, which is for input of a wait signal from the exterior, is provided. When the wait signal is supplied, the external bus controller extends the access time to the external device in accordance with the wait signal. In this way, even in the case of high-speed testing which is performed at a clock signal which is higher-speed than that at the time of usual operation, correct data can be read from an external device.

In accordance with the second aspect of the present invention, a wait signal generating section, which, on the basis of a control signal outputted from the processor, generates await signal which designates extension of the access time to the external device, is provided. In this way, it is possible to extend the time over which the external device is accessed from the external bus controller, and effects similar to those of the first aspect of the present invention are obtained.

In accordance with the third aspect of the present invention, a re-map signal generating section, which generates a re-map signal on the basis of a control signal outputted from the processor, is provided. In this way, due to the bus interface specifying the external device when the re-map signal is supplied to the bus interface, the access time can be extended on the basis of the wait signal provided at the external device. Accordingly, effects similar to those of the first aspect of the present invention are obtained.

BRIEF DESCRIPTION OF THE DRAWINGS

FIG. 8 is a diagram showing the contents of a decoder 12b in an I/F 12A in FIG. 7.

DETAILED DESCRIPTION OF THE INVENTION

An external bus controller, which is structured by a state machine and which is provided with an input terminal for input of a wait signal which designates an extension of the access time to an external device connected to the system LSI, is provided with a function for extending the access time by extending the output time of an address signal or a selection signal for an external device, in accordance with the wait signal.

FIRST EMBODIMENT

Figure 1:
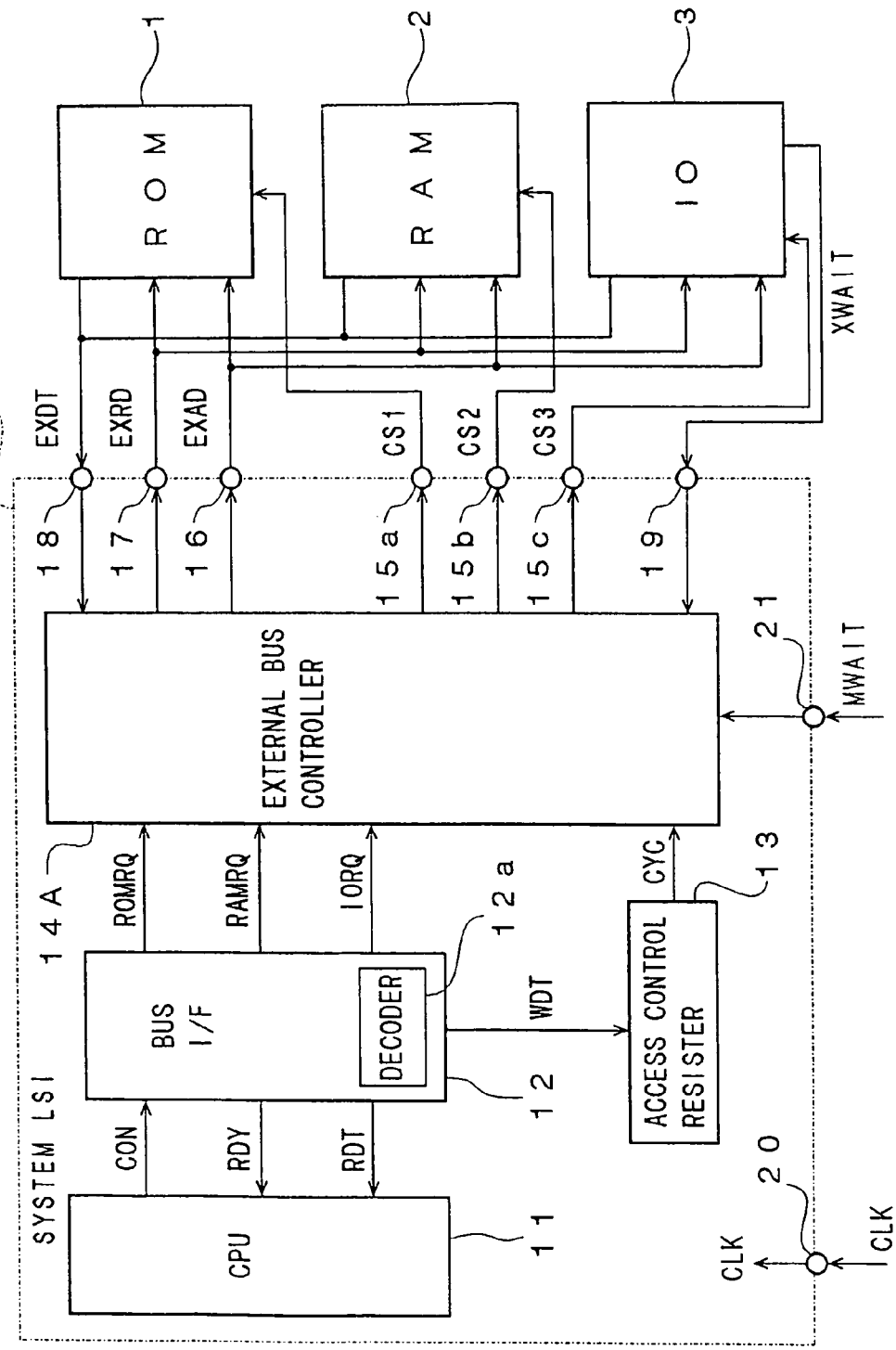
FIG. 1 is a structural diagram of a system LSI showing a first embodiment of the present invention.

FIG. 1 is a structural diagram of a system LSI showing a first embodiment of the present invention. In FIG. 1, the same reference numerals are applied to elements which are the same as those in FIG. 2.

A system LSI 10A can access external devices such as the external ROM 1 or RAM 2, or the input/output device 3, or the like, and has the CPU 11 which carries out computation and control on the basis of programs stored in the ROM 1. The CPU 11 is connected to the access control register 13 and to an external bus controller 14A via the bus I/F 12.

The bus I/F 12 serves as an intermediary at the time when the CPU 11 carries out writing and reading with respect to the access control register 13. The control signal CON, for controlling various types of operations, is supplied from the CPU 11 to the bus I/F 12. The ready signal RDY, which expresses whether or not preparations have been completed, and the read data RDT are supplied from the bus I/F 12 to the CPU 11.

The access control register 13 holds access time data, which instructs an access time to an external device and which is supplied as the write data WDT from the CPU 11 via the bus I/F 12. The access control register 13 functions to transfer the held access time data as the access cycle value CYC to the external bus controller 14A.

Moreover, the bus I/F 12 has the decoder 12a which has the function of supplying, on the basis of the control signal CON supplied from the CPU 11 and as the request signals ROMRQ, RAMRQ, IORQ and to the external bus controller 14A, information expressing which external device (i.e., the ROM 1, the RAM 2, or the input/output device 3) is desired to be accessed.

The external bus controller 14A is structured by a state machine. The external bus controller 14A is a structure which, when a request signal is supplied from the bus I/F 12, carries out a reading or writing access operation with respect to the external device requested in the request signal, at an access cycle corresponding to the access cycle value CYC transferred from the access control register 13.

A wait signal MWAIT, which instructs extension of the access time to the external device, is supplied to the external bus controller 14A via an input terminal 21. At the time of reading the external data EXDT, when the external bus controller 14A asserts the wait signal MWAIT up until one cycle at which the external bus read signal is de-asserted, the external bus controller 14A extends the access time by the access cycle value CYC which is instructed by the access time data set at the access control register 13.

Moreover, the access time can be extended by adding one or plural access times to the access time instructed in the access cycle value CYC. Note that extending of the access time is carried out by extending the time over which the external address signal EXAD and the selection signals CS1–CS3 are outputted.

Figure 3:
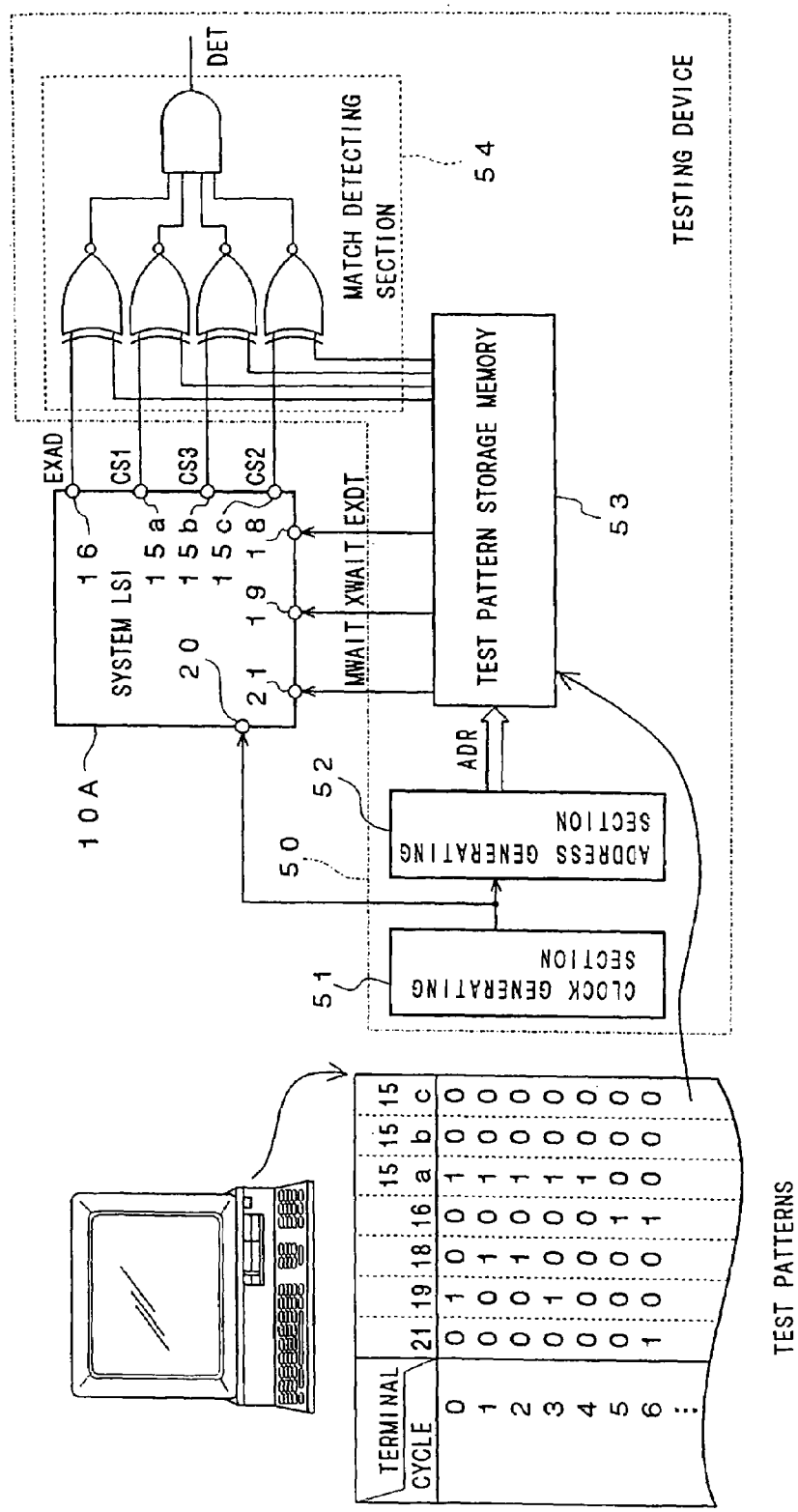
FIG. 3 is a structural diagram at the time of high-speed testing of a system LSI 10A of FIG. 1.

FIG. 3 is a structural diagram at the time of high-speed testing of the system LSI 10A of FIG. 1.

At the time of high-speed testing, the external terminals 15–19 of the system LSI 10A which is the object of testing are connected to a testing device 50 instead of the external devices. Moreover, a high-speed clock signal CLK is supplied from the testing device 50 to the clock terminal 20. The wait signal MWAIT is supplied from the testing device 50 to the input terminal 21. The testing device 50 has a clock generating section 51, an address generating section 52, a test pattern storage memory 53, and a match detecting section 54. The clock generating section 51 generates the high-speed clock signal CLK for testing. This clock signal CLK is supplied to the address generating section 52 and to the clock terminal 20 of the system LSI. By counting the clock signals CLK, the address generating section 52 generates an address signal ADR for the test pattern storage memory 53.

The test pattern storage memory 53 has determined signal patterns of the external terminals 15–19 and the input terminal 21 of the system LSI 10A at the time of normal operation, by simulation and in advance and as test patterns for each clock, and has stored these test patterns. Among the test patterns read out from the test pattern storage memory 53, the external data EXDT and the wait signals XWAIT, MWAIT are supplied to the external terminals 18, 19 and the input terminal 21 of the system LSI 10A, respectively, and the selection signals CS1–CS3 and the external address signal EXAD are supplied to the match detecting section 54.

The match detecting section 54 is a structure which detects whether or not the selection signals CS1–CS3 and the external address signal EXAD, which were outputted from external terminals 15a–15c, 16 of the system LSI 10A, and the selection signals CS1–CS3 and the external address signal EXAD, which were supplied from the test pattern storage memory 53, match.

The system LSI 10A is tested by using the testing device 50 at which a test pattern, which supplies the wait signal MWAIT for a predetermined time to the external terminal 21 of the system LSI 10A which is the object of testing, is created in advance.

Figure 4:
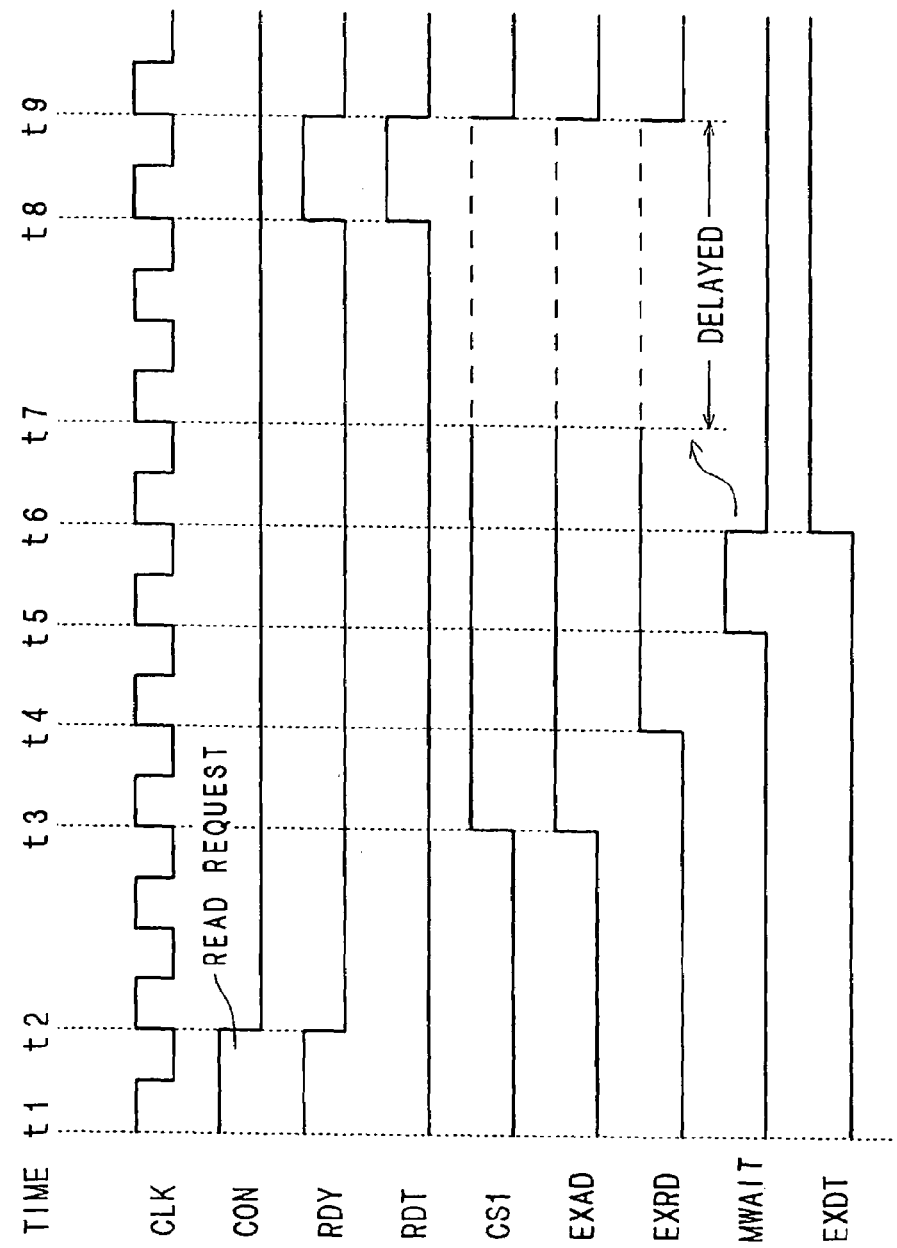
FIG. 4 is a signal waveform diagram showing operation of FIG. 1.

FIG. 4 is a signal waveform diagram showing operation of FIG. 1. Hereinafter, operation at the time of high-speed testing of FIG. 1 will be described with reference to FIG. 4.

At the rise of the clock CLK at time t1 in FIG. 4, the control signal CON of a read request is outputted from the CPU 11.

At the rise of the next clock signal CLK at time t2, the ready signal RDY outputted from the bus I/F 12 changes from "H" to "L". At the bus I/F 12, the read request from the CPU 11 is analyzed, and, for example, the request signal ROMRQ for the ROM 1 is outputted to the external bus controller 14A.

At the rise of the clock CLK at time t3, the selection signal CS1 and the external address signal EXAD are outputted from the external bus controller 14A.

At the rise of the clock CLK at time t4, the external bus read signal EXRD changes from "L" to "H".

At the rise of the clock CLK at time t5, i.e., one cycle before the external bus read signal EXRD is de-asserted, the wait signal MWAIT outputted from the testing device 50 is asserted and becomes "H".

At the rise of the next clock CLK at time t6, the wait signal MWAIT returns to "L", and the external bus data EXDT becomes "H".

From the rise of the next clock CLK at time t7 on, the access time is extended by the set length of the external bus read signal EXRD, and the selection signal CS1, the external bus address EXAD, and the external bus read signal EXRD continue to be outputted.

At the rise of the clock signal CLK at time t8, the ready signal RDY changes from "L" to "H", and the read data RDT is outputted. In this way, the external bus data EXDT outputted from the testing device 50 is read by the CPU 11.

At the rise of the clock signal CLK at time t9, the ready signal RDY and the selection signal CS1 become "L", and the reading operation is completed.

As described above, the system LSI of the first embodiment has the input terminal 21, which is for supply of the wait signal MWAIT from the exterior, and has the external bus controller 14A which, when this wait signal MWAIT is supplied, can freely extend the access time for reading. In this way, there is the advantage that high-speed testing can be carried out without being affected by the driving capacities of the external terminals.

SECOND EMBODIMENT

Figure 5:
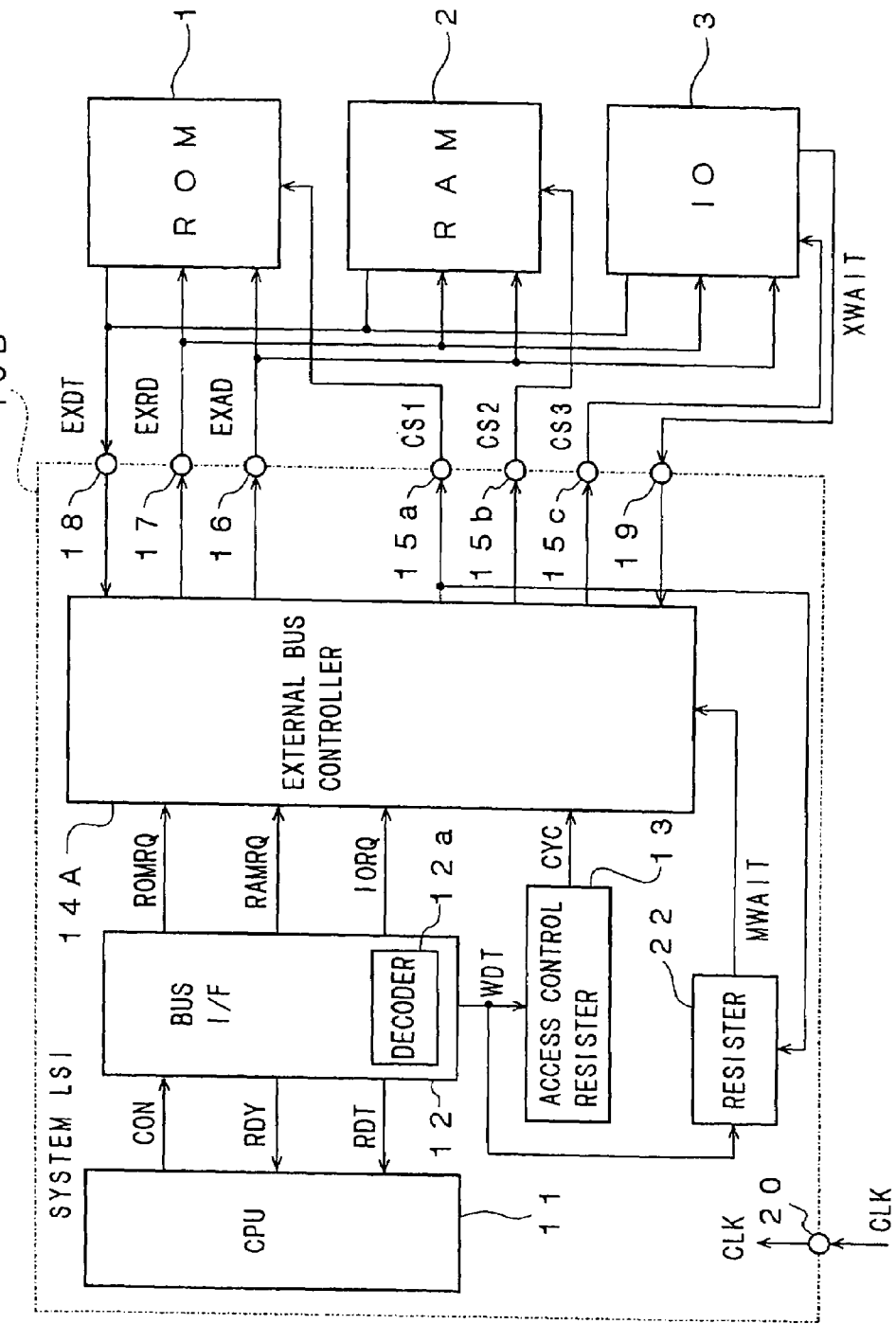
FIG. 5 is a structural diagram of a system LSI showing a second embodiment of the present invention.

FIG. 5 is a structural diagram of a system LSI showing a second embodiment of the present invention. In FIG. 5, the same reference numerals are applied to elements which are the same as those in FIG. 1.

In a system LSI 10B, the input terminal 21 in FIG. 1 is not provided, and in place thereof, a register 22, which generates the wait signal MWAIT, is provided internally. The register 22 holds, as a set value, the write data WDT outputted from the CPU 11 to the access control register 13 via the bus I/F 12. When the selection signal CS1 for the ROM 1 is asserted, the register 22 outputs the wait signal MWAIT during a time period of a number of cycles corresponding to the set value. The wait signal MWAIT is supplied to the external bus controller 14A. The other structures are the same as those in FIG. 1.

Figure 6:
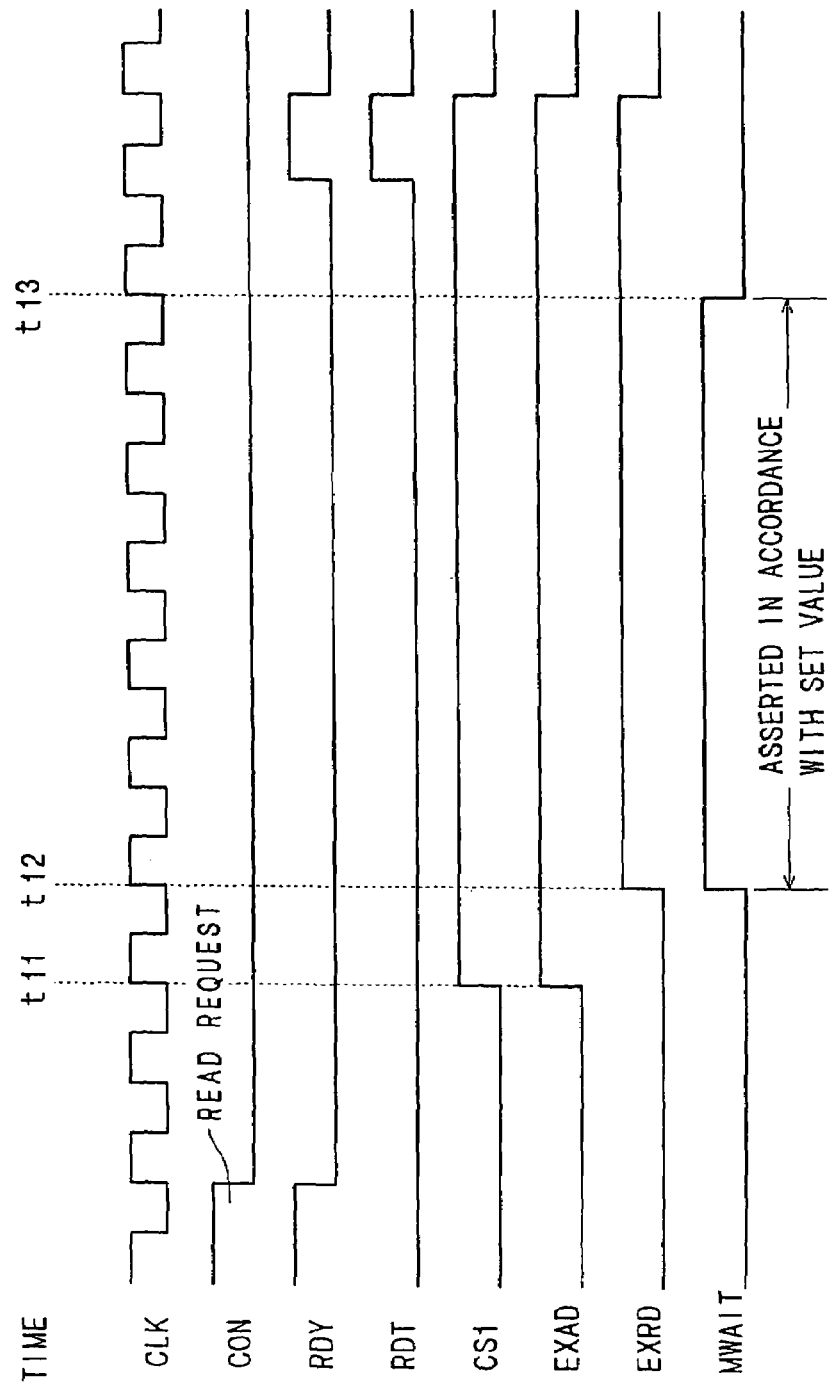
FIG. 6 is a signal waveform diagram showing operation of FIG. 5.

FIG. 6 is a signal waveform diagram showing operation of FIG. 5.

The operation is substantially the same as that of the system LSI 10A of FIG. 1. When the selection signal CS1 for the ROM 1 changes from "L" to "H" at time t11, the wait signal MWAIT outputted from the register 22 changes from "L" to "H" at time t12 which is the next rise of the clock signal CLK. Then, the wait signal MWAIT is "H" for a time period corresponding to the set value which was set at the access control register 13, and returns to "L" at time t13 when this time period has elapsed.

In this way, at the system LSI 10B, the access time is extended by writing a predetermined value to the register 22 and asserting the wait signal MWAIT with respect to the external bus controller 14A.

As described above, the system LSI of the second embodiment has the register 22, which generates the wait signal MWAIT from the internal control signal CON, and has the external bus controller 14A which, when the wait signal MWAIT is supplied, can freely extend the access time for reading. In this way, the same advantage as in the first embodiment can be obtained, but without providing the external terminal for testing.

THIRD EMBODIMENT

Figure 7:
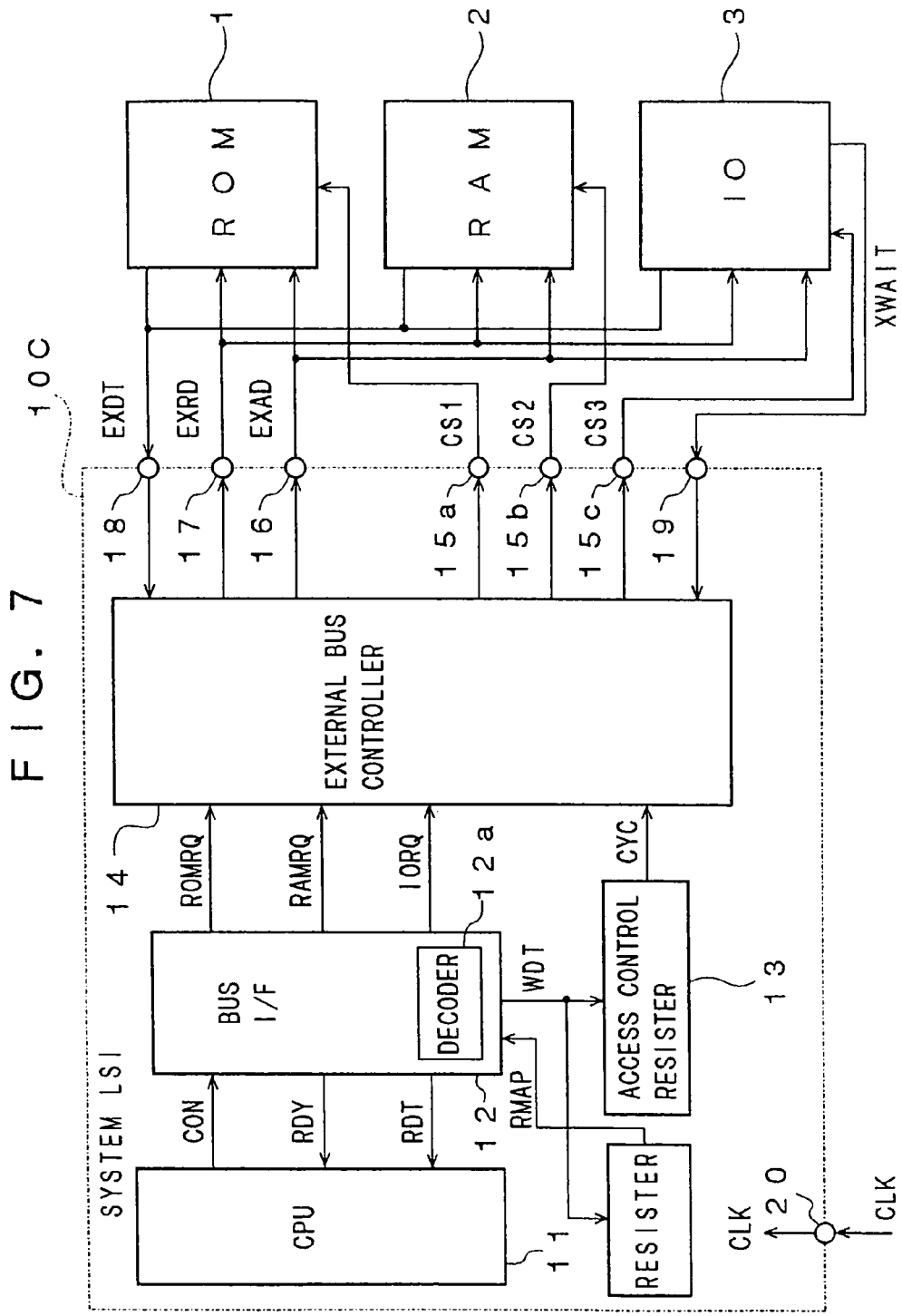
FIG. 7 is a structural diagram of a system LSI showing a third embodiment of the present invention.

FIG. 7 is a structural diagram of a system LSI showing a third embodiment of the present invention. In FIG. 7, the same reference numerals are applied to elements which are the same as those in FIG. 2.

Figure 2:
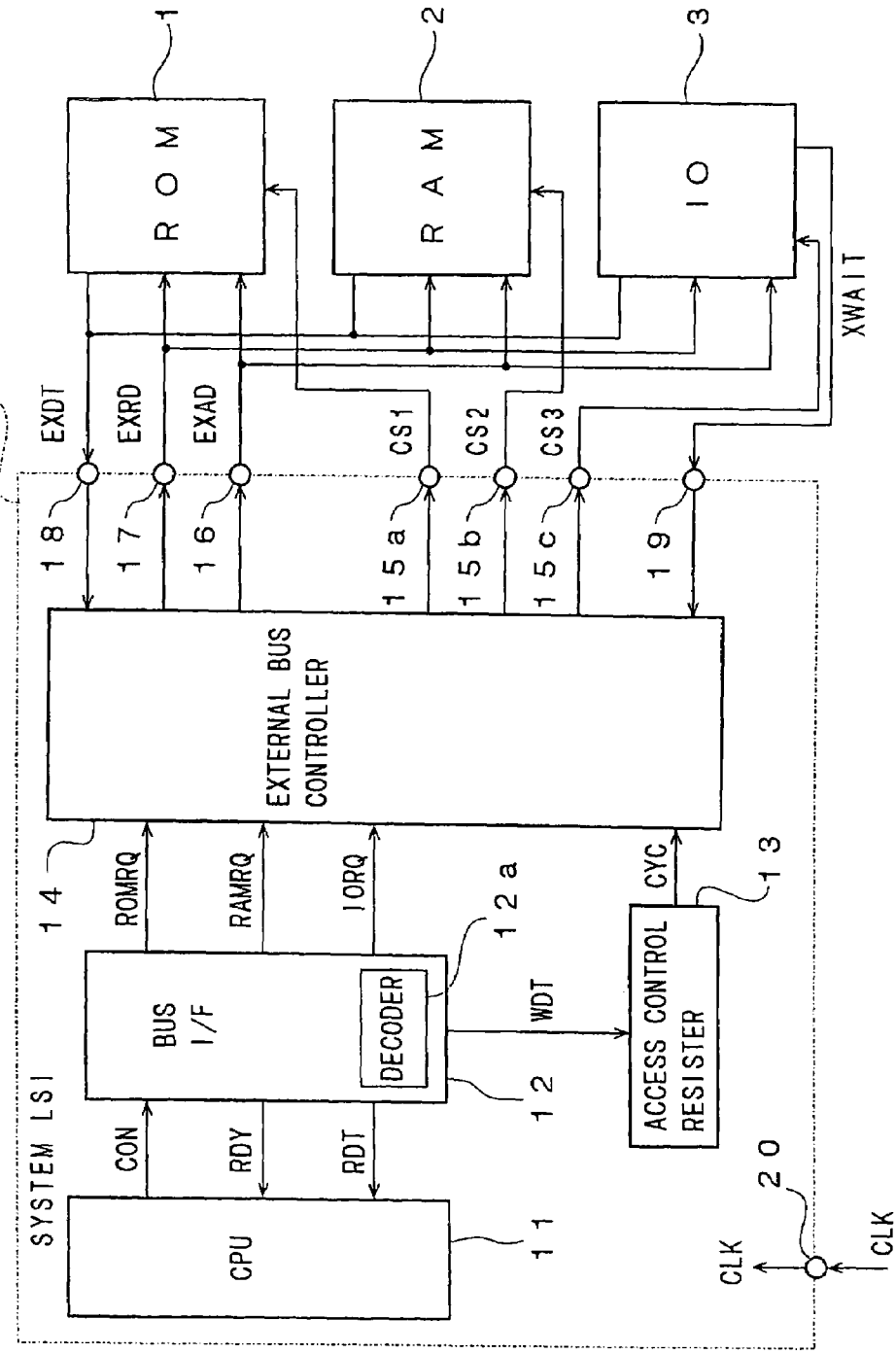
FIG. 2 is a structural diagram showing the basics of a conventional system LSI.

A system LSI 10C has, in place of the bus I/F 12 of FIG. 2, a bus I/F 12A having a different function. The system LSI 10C also has a register 23 for generating a re-map signal RMAP with respect to the bus I/F 12A.

The register 23 holds, as a set value, the write data WDT outputted from the CPU 11 to the access control register 13 via the bus I/F 12A, and outputs the held value as the re-map signal RMAP. The re-map signal RMAP is supplied to the bus I/F 12A.

In the same way as the bus I/F 12 in FIG. 2, the bus I/F 12A is an intermediary at the time when the CPU 11 carries out reading or writing with respect to the access control register 13. Namely, the control signal CON for controlling various types of operations is supplied from the CPU 11 to the bus I/F 12A. The ready signal RDY, which expresses whether or not preparations have been completed, and the read data RDT are supplied from the bus I/F 12A to the CPU 11.

Moreover, the bus I/F 12A has a decoder 12b which has the function of supplying, on the basis of the control signal CON supplied from the CPU 11 and the re-map signal RMAP supplied from the register 23, information expressing which external device is desired to be accessed, to the external bus controller 14 and as the request signals ROMRQ, RAMRQ, IORQ.

FIG. 8 is a diagram showing the contents of the decoder 12b at the I/F 12A in FIG. 7. As shown in FIG. 8, at the decoder 12b, the re-map signal RMAP is used, in addition to the control signal CON, as a signal which is the object of decoding.

Namely, in the decoder 12b, a first bank (in this case, the ROM 1) in which are stored programs which the CPU 11 reads after resetting of the system LSI 10C is cancelled, and a second bank (in this case, the input/output device 3) which is used at the time of accessing an arbitrary device connected to the system LSI 10C, can be selected by the re-map signal RMAP.

In this system LSI 10C, when the re-map signal RMAP is outputted from the register 23, the input/output device 3 is mapped, as the bank in which programs for execution are stored, at the decoder 12b of the bus I/F 12A by the re-map signal RMAP. The input/output device 3 has the function of outputting the wait signal XWAIT for freely extending the access time. Therefore, the access time for reading is extended at the external bus controller 14 on the basis of the wait signal XWAIT.

As described above, the system LSI of the third embodiment has the register 23, which outputs the re-map signal RMAP on the basis of the control signal CON, and has the bus I/F 12A which has the decoder 12b which, when the re-map signal RMAP is supplied, maps the input/output device 3, instead of the ROM 1, as the bank in which programs are stored. In this way, by using the wait signal XWAIT which the input/output device 3 originally has, the access time for reading can be arbitrarily extended. Accordingly, because the external bus controller 14 which is similar to that of the conventional art can be used, there is the advantage that the number of steps of developing the state machine (the external bus controller 14) can be reduced.

Note that the present invention is not limited to the above-described embodiments, and various modifications are possible. For example, the structures of the system LSIs 10A~10C are examples, and the present invention can similarly be applied to structures in which circuits of timers, analog/digital converters, and the like are built-in.

What is claimed is:

1. A system LSI (large scale integrated circuit) comprising:
    a group of external terminals to which a plurality of external devices can be connected;
    a processor carrying out computation and control on the basis of programs;
    a bus interface specifying an external device which is to be an object of access from among the plurality of external devices on the basis of a control signal outputted from the processor, and outputting access time data instructing an access time to said external device and a request signal requesting access to said external device;
    a register storing the access time data outputted from the bus interface;
    an input terminal to which is inputted, from an exterior, a wait signal which designates extension of the access time to said external device; and
    an external bus controller which, in accordance with the access time data stored in the register and the request signal outputted from the bus interface, accesses said external device via the group of external terminals, and extends the access time to said external device in accordance with the wait signal inputted to the input terminal,
    wherein the external bus controller extends the access time to said external device in units of the access time which the access time data instructs.

2. The system LSI of claim 1, wherein the external bus controller extends the access time to said external device by adding one of or a plurality of the access times to the access time which the access time data instructs.

3. The system LSI of claim 1, wherein the external bus controller extends the access time by extending a time in which an address of said external device is outputted to said external device.

4. The system LSI of claim 1, wherein the external bus controller extends the access time by extending a time in which a selection signal, which instructs that said external device be selected, is outputted to said external device.

5. A system LSI (large scale integrated circuit) having a processor successively reading programs and carrying out computation and control; a bus interface specifying an external device which is to be an object of access on the basis of a control signal outputted from the processor; an access control register setting an access extension time with respect to said external device; and an external bus controller carrying out reading and writing of data between the bus interface and said external device in accordance with the access extension time,
    wherein the system LSI comprises a wait signal generating section which, on the basis of a control signal outputted from the processor, generates a wait signal which designates extension of an access time to said external device, and the external bus controller extends the access time to said external device in accordance with the wait signal.

6. A system LSI (large scale integrated circuit) having a processor successively reading programs and carrying out computation and control; a bus interface specifying, on the basis of a control signal outputted from the processor, one of an external device which is to be an object of access and an external device which is to output a wait signal; an access control register setting an access extension time with respect to said external device; and an external bus controller carrying out reading and writing of data between the bus interface and said external device in accordance with one of the extension time and the wait signal, wherein the system LSI comprises a re-map signal generating section which, on the basis of a control signal outputted from the processor, generates a re-map signal, and the control signal specifies said external device when the re-map signal is supplied to the bus interface.

7. The system LSI of claim 5, wherein the external bus controller extends the access time to said external device by adding one of or a plurality of access times to an access time corresponding to the wait signal.

8. The system LSI of claim 5, wherein the external bus controller extends the access time by extending a time in which an address of said external device is outputted to said external device.

9. The system LSI of claim 5, wherein the external bus controller extends the access time by extending a time in which a selection signal, which instructs that said external device be selected, is outputted to said external device.

* * * * *